US005969691A

United States Patent [19]

Myers

[11] Patent Number: 5,969,691

[45] Date of Patent: Oct. 19, 1999

[54] FUEL DISPENSER TRANSPONDER ANTENNA ARRANGEMENT

[75] Inventor: Howard M. Myers, Greensboro, N.C.

[73] Assignee: Gilbarco Inc., Greensboro, N.C.

[21] Appl. No.: 09/021,214

[22] Filed: Feb. 10, 1998

[51] Int. Cl.$^{6}$ .............................. G06F 17/60; H01Q 1/38

[52] U.S. Cl. .................................. 343/834; 343/700 MS; 343/846; 340/825.72; 340/696; 222/23

[58] Field of Search ............................... 222/192, 23, 39, 222/52; 343/834, 720, 879, 912, 914

[56] References Cited

U.S. PATENT DOCUMENTS

| | | | |
|---|---|---|---|
| 3,482,165 | 12/1969 | Leming | 325/56 |
| 3,936,837 | 2/1976 | Coleman et al. | 343/781 |
| 4,263,945 | 4/1981 | Van Ness | 141/98 |
| 4,463,055 | 7/1984 | Hodges | 428/458 |
| 4,499,464 | 2/1985 | Knox et al. | 340/825.72 |
| 4,939,526 | 7/1990 | Tsuda | 343/756 |
| 5,303,240 | 4/1994 | Borras et al. | 370/95.3 |
| 5,400,418 | 3/1995 | Pearson et al. | 385/11 |
| 5,491,723 | 2/1996 | Diepstraten | 375/267 |
| 5,535,130 | 7/1996 | Long | 364/479 |
| 5,576,717 | 11/1996 | Searle et al. | 342/373 |
| 5,606,323 | 2/1997 | Heinrich et al. | 342/51 |
| 5,612,890 | 3/1997 | Strasser et al. | 364/479.11 |
| 5,703,600 | 12/1997 | Burrell et al. | 343/700 MS |
| 5,767,810 | 6/1998 | Hagiwara et al. | 343/700 MS |
| 5,798,931 | 8/1998 | Kaehler | 364/479.01 |

FOREIGN PATENT DOCUMENTS

WO 97/24689 7/1997 WIPO .

*Primary Examiner*—Don Wong
*Assistant Examiner*—James Clinger
*Attorney, Agent, or Firm*—Coats & Bennett, P.L.L.C.

[57] ABSTRACT

The present invention provides a fuel dispenser antenna configuration having an antenna with a directive radiation pattern for receiving or transmitting electromagnetic energy, and a reflective surface on the fuel dispenser housing for redirecting the directive radiation pattern of the antenna so that the directive radiation pattern reflects off of the reflective surface and extends in a second direction over a fueling position.

35 Claims, 2 Drawing Sheets

FUEL DISPENSER TRANSPONDER ANTENNA ARRANGEMENT

BACKGROUND OF THE INVENTION

The present invention relates generally to fuel dispensers and, more particularly, to an antenna and reflector arrangement for a fuel dispenser to redirect a directive radiation pattern over a desired portion of a fueling position associated with the dispenser.

In recent years, traditional gasoline pumps and service stations have evolved into elaborate point-of-sale (POS) devices having sophisticated control electronics and user interfaces with large displays and touch-pads or screens. The dispensers include various types of payment means, such as card readers, to expedite and further enhance fueling transactions. A customer is not limited to the purchase of fuel at the dispenser. More recent dispensers allow the customer to purchase services, such as car washes, and goods, such as fast food or convenience store products at the dispenser. Once purchased, the customer need only pick up the goods and services at the station store or the outlet of a vending machine.

Remote transaction systems have evolved wherein the fuel dispenser is adapted to communicate with various types of remote communication devices, such as transponders, to provide various types of identification and account information to the fuel dispenser automatically. These remote transaction systems require multiple antennas to communicate with transponders or like remote communications units. Numerous antennas are necessary to provide directive radiation patterns over various parts of the same fueling position, as well as to transmit and receive signals to and from the transponders. Given the increase in the amount of electronics and hardware in today's smaller dispenser housings, there is often insufficient vertical area available to mount antennas. Furthermore, there is a limited number of acceptable mounting locations inside a dispenser providing an unobstructed path to the fueling position outside the housing. Many of these locations are unsuitable due to wiring and mounting problems.

Thus, there is a need for a way to overcome the difficulties in mounting numerous antennas in a limited space within the fuel dispenser and still provide a desired directive radiation pattern, or lobe, over the fueling position.

SUMMARY OF THE INVENTION

The present invention provides such a solution by mounting the antenna at an available location oriented in a non-vertical plane and using a reflector to redirect the directive radiation pattern and, therefore, signals transmitted to and from a transponder in the proper direction.

Accordingly, one aspect of the present invention provides a fuel dispenser antenna configuration having an antenna with a directive radiation pattern for receiving or transmitting electromagnetic energy, and a reflective surface on the fuel dispenser housing for redirecting the directive radiation pattern of the antenna so that the directive radiation pattern reflects off of the reflective surface and extends in a second direction over a fueling position. The reflective surface may be a metallic or electromagnetically reflective surface of the fuel dispenser or be a reflective foil or sticker placed on a dispenser surface. The first surface in which the antenna is mounted may be at any angle with respect to the dispenser face. For example, the antenna may be horizontally mounted. The second surface for reflecting the electromagnetic energy or radiation pattern will complement the angle of the first surface holding the antenna in order to reflect the directive radiation pattern substantially over a desired portion of the fueling position. The housing includes the outer shell of the dispenser, as well as any frame, structural or other components within the shell.

Another aspect of the present invention provides a fuel dispenser having a housing with a front face and appropriate fuel delivery hardware. An antenna having a directive radiation pattern for receiving or transmitting electromagnetic energy is mounted on the dispenser housing in a first plane where the directive radiation pattern extends in a first direction, which is generally normal to the first plane. A reflective surface is provided on the fuel dispenser housing in a second plane for redirecting the directive radiation pattern of the antenna so that the pattern reflects off of the reflective surface and extends in a second direction over the fueling position.

The reflective surface may include a metallic foil or other material capable of reflecting electromagnetic energy and, in particular, the signals transmitted to and from the dispenser. The antenna and reflective surface may be anywhere on the dispenser housing, and may be mounted inside or outside of any of the housing surfaces. Those portions of the dispenser housing through which signals must pass to reach the reflective surface or the antenna must be substantially transparent to electromagnetic energy. These surfaces may be made of plastic, fiberglass or any other material substantially transparent to electromagnetic energy.

Yet another aspect of the present invention provides a method including the steps of providing a directive radiation pattern in a first direction from a radio frequency antenna at a fuel dispenser and redirecting the directive radiation pattern in a second direction over a fueling position associated with the fuel dispenser with a reflective surface. The method may include transmitting radio frequency signals over the fueling position as well as receiving such signals emanating from the fueling position in the redirected directive radiation pattern.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
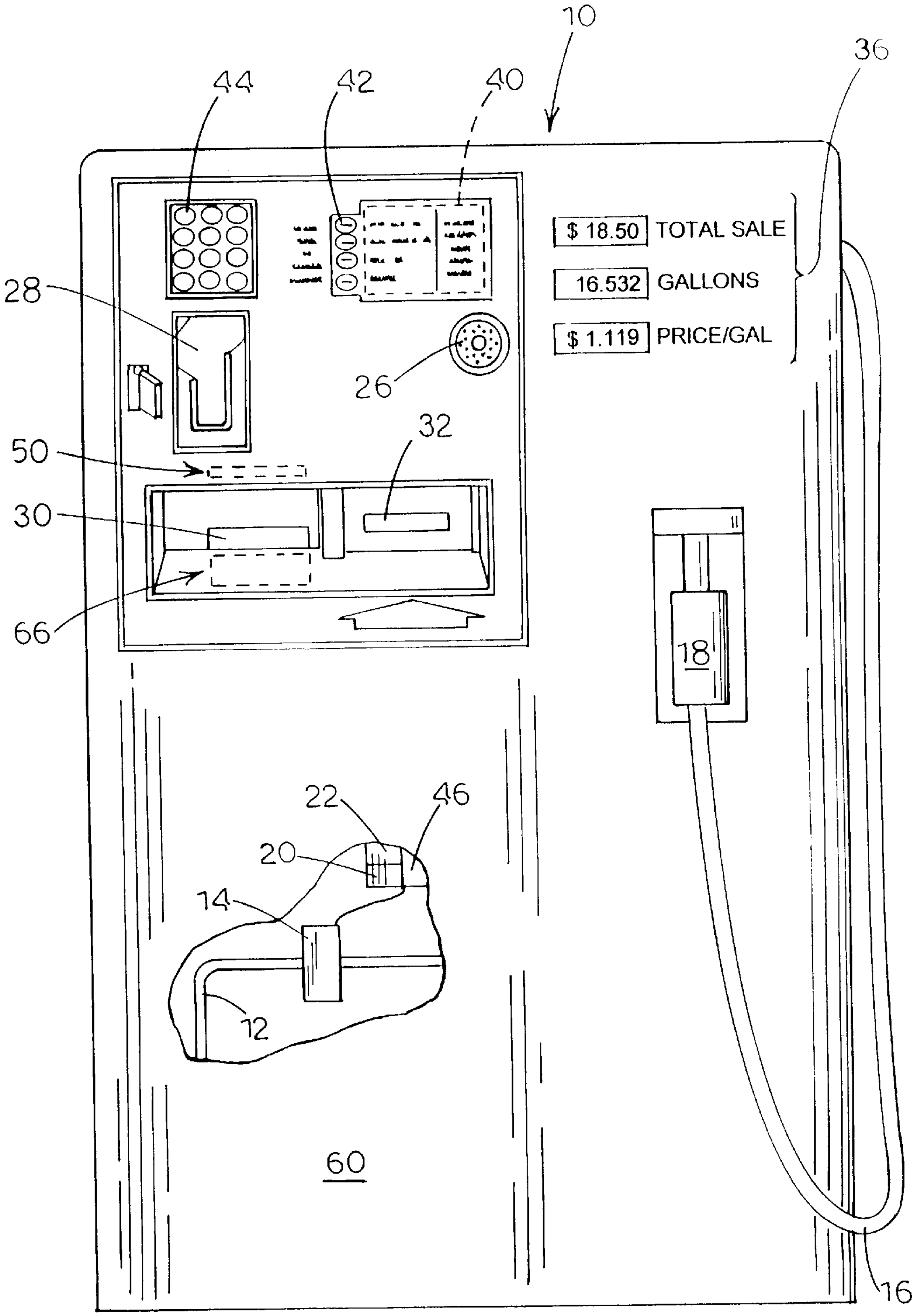
FIG. 1 is a schematic representation of a fuel dispenser constructed according to the present invention.

In the following description, like reference characters designate like or corresponding parts throughout the several figures. It should be understood that the illustrations are for the purpose of describing preferred embodiments of the invention and are not intended to limit the invention thereto.

As best seen in FIG. 1, a fuel dispenser, generally designated 10, is shown constructed according to the present invention. The fuel dispenser provides a fuel delivery path from an underground storage tank to a vehicle (not shown). The delivery path includes a fuel delivery line 12 having a fuel pump/metering device 14. A fuel delivery line 12 communicates with a fuel delivery hose 16 outside of the dispenser 10 and a delivery nozzle 18. The nozzle 18 provides manual control of fuel delivery to the vehicle.

The dispenser 10 generally includes a control system having a controller 20 and associated memory 22. The controller 20 may receive volume data from the pump/meter device 14 through cabling 24 as well as provide control of fuel delivery. The controller 20 may provide audible signals to an audio module and speaker 26 in order to provide various beeps, tones and audible messages to an operator. These messages may include warnings, instructions and advertising.

The dispenser 10 may be equipped with a card reader 28 or a cash acceptor 30 and a receipt printer 32. With these options, the dispenser controller 20 may read data from a magnetic strip when a card is inserted in the card reader 28 and communicate to a service-station-based controller, such as the G-site controller sold by Gilbarco, Inc. of Greensboro, N.C. The service station-based controller generally communicates with a remote credit card verification authority to ascertain whether a transaction proposed to be charged to or debited from the account associated with the card inserted in the card reader 28 is authorized.

The dispenser 10 may also include various types of displays, preferably, one or more alpha numeric displays 36 in addition to a high-resolution graphics display 40. Preferably, the graphics display 40 will have an associated graphics display keypad 42 adjacent the display or integrated with the graphics display 40 to provide a touch screen interface. The dispenser may have an additional general keypad 44 for entering data. Notably, the displays 36, 40 and keypads 42, 44 may be integrated into a single device. The controller 20 is desirably comparable to the microprocessor based control systems used in CRIND (card reader in the dispenser) and TRIND (tag or transponder reader in the dispenser) type units sold by Gilbarco, Inc. under the trademark THE ADVANTAGE.

In order to communicate with the various remote communication units, referred to hereinafter as transponders in a most generic sense, the fuel dispenser will include communication electronics 46 coupled to one or more antennas 50. The communication electronics 46 will operate in conjunction with the controller 20 or control system to provide information for transmission to a transponder via the communication electronics 46 and an antenna 50, as well as receive information from the transponder 52 through an antenna 50 and the communication electronics 46.

Figure 2:
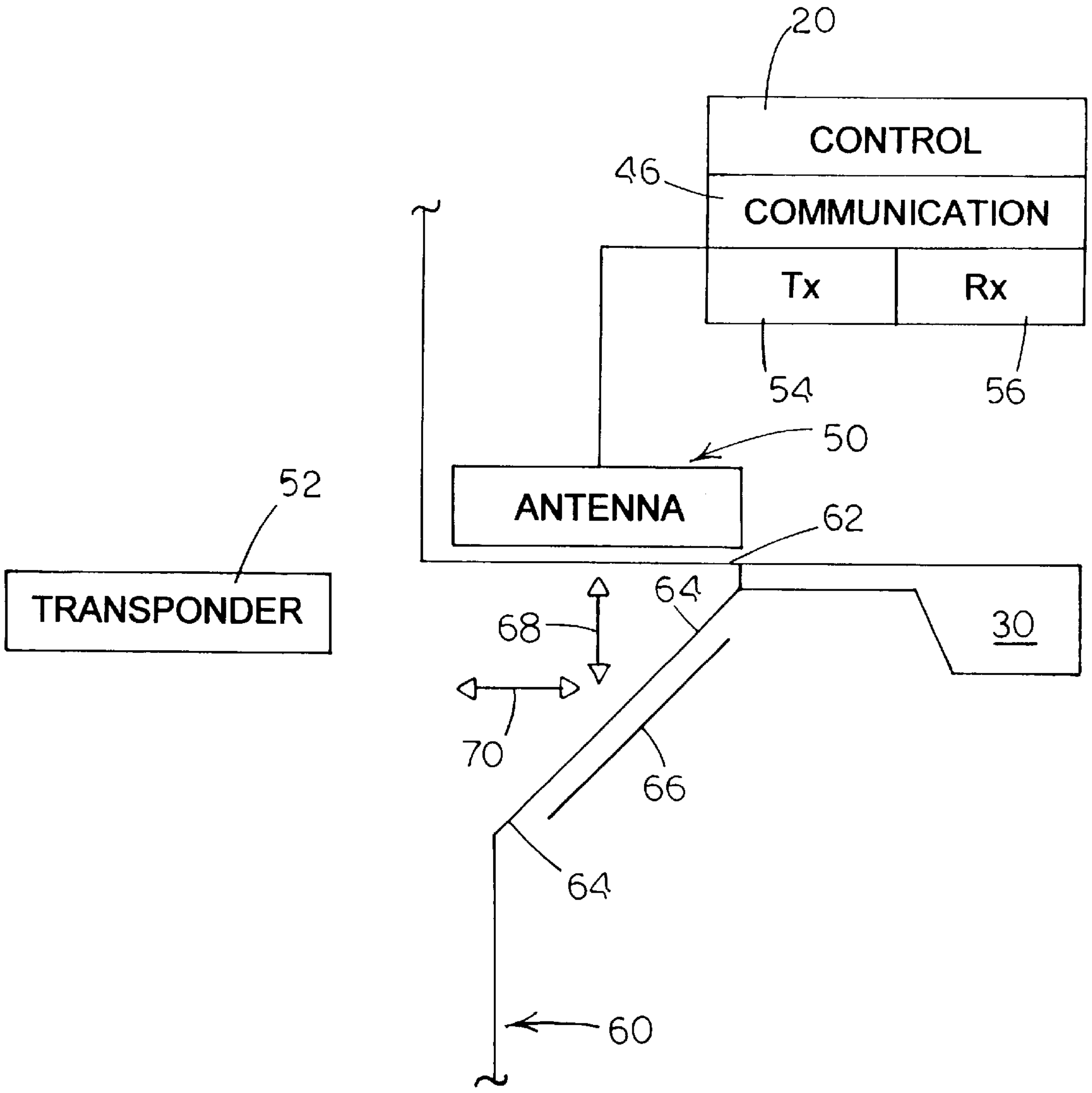
FIG. 2 is a partial cross-sectional view of a fuel dispenser incorporating the antenna and reflector arrangement according to the present invention.

As shown in FIG. 2, the communication electronics will generally include a transmitter 54 and receiver 56 to facilitate transmission and reception of information to and from a transponder 52. Depending on the application, various numbers of antennas and antenna arrangements are possible and deemed within the scope of the claimed invention. For example, certain embodiments may have dedicated antennas for receiving information from the transponder and separate antennas for transmitting information to the transponder. Other embodiments may include the necessary switching or circulator electronics to allow a single antenna or set of antennas to both transmit and receive information to and from transponders. Thus, the antennas may transmit, receive, or both transmit and receive, depending on the configuration of the associated electronics, and the claims should be interpreted accordingly.

Along these lines, antennas configured to either transmit or receive will preferably have a directive radiation pattern or lobe. The directive radiation pattern for transmitting antennas will include a relatively focused or defined pattern or space in which signals are effectively transmitted. Likewise, the directive radiation pattern for an antenna configured to receive signals represents the pattern or space in which signals transmitted from a transponder are effectively received. In short, the directive radiation pattern represents the pattern or space in which signals are transmitted or from which signals can be received by an antenna.

U.S. provisional application Ser. No. 60/060,066 filed Sep. 26, 1997, entitled COMPREHENSIVE INTELLIGENT FUELING in the name of Timothy E. Dixon et al., provides several antenna arrangements usable within the scope of the present invention. The disclosure of this application is incorporated herein by reference.

Applicant has found that antennas for use in a fueling environment are preferably highly directive in order to provide a focused radiation pattern for either transmitting or receiving transponder signals. Given the directive or focused nature of these antennas, numerous antennas may be used for each fueling position of a fuel dispenser, and, preferably, numerous antennas for each fueling position may be used to provide multiple paths of communication to and from the transponder in case a person or other object interferes with or blocks signals being transmitted to and from the transponder. The present invention typically operates at radio frequencies in the microwave range, so objects can possibly block signal transmission. Certain of these antennas are configured in an antenna block, which is typically a flat rectangular configuration having dimensions in order of a few inches.

In an effort to properly locate the directive radiation pattern for the potentially numerous antennas and maintain aesthetics of the fuel dispenser, the present invention provides a unique system and method of mounting an antenna having a directive radiation pattern and redirecting the directive radiation pattern using a electromagnetic wave reflector 66. The antenna 50 and reflector 66 arrangement is particularly useful when a desired area from which the directive pattern extends is not conducive to vertically mounting the antenna. For example, given the extensive amount of electronics and dispensing hardware in today's smaller dispenser housings, there is a decreasing amount of space to place more components. Furthermore, the areas necessary to place or mount antennas are often arranged or angled in a manner which would improperly focus or direct the directive radiation pattern.

The present invention provides an antenna 50 on a first surface 62 and a reflector 66 on a second surface 64 wherein the antenna 50 lies in a first plane and typically provides a directive radiation pattern normal to the first plane. The reflector 66 lies in a second plane at a complementary angle to the first plane in a manner where the directive radiation pattern from the antenna 50 is reflected and redirected by the reflector 66 in a desired direction or space.

FIG. 2 is exemplary of a fuel dispenser configuration implementing the preferred embodiment of the present invention. In this embodiment, a directive radiation pattern from an antenna extending outward from the customer interface was desired. Given the close proximity of the various electronics and hardware in this area of the dispenser, mounting the antenna flush against the inside surface of the front face 60 of the dispenser housing would make the antenna difficult to access and connect to the communication electronics 46. In certain dispenser configurations, sufficient space may not be available to mount the antenna, regardless of connection difficulty.

The present invention solves this problem by using an available surface in the dispenser on which to mount the antenna 50 and provide a reflector 66 on a surface having an angle sufficiently complementary to the antenna 50 in order to redirect the directive radiation pattern from the antenna outward in front of the customer interface of the fuel dispenser.

In this example, the antenna 50 is mounted inside the front face 60 of the dispenser housing on the first surface 62. The reflector 66 is also mounted inside the front face 60 of the dispenser housing on the second surface 64. In a preferred embodiment, the reflector 66 is a metal foil adhered with adhesive to the surface 64. The front face 60 of the housing provides the angled surfaces 62, 64 to facilitate mounting and use of the cash acceptor 30. The first surface 62 is a horizontal portion of the front face 60 over the top of an area for inserting cash into the cash acceptor 30 and the second surface 64 is sloped to aid insertion of cash into the cash acceptor 30. The arrows 68, 70 indicate the redirection of signals transmitted to and from the transponder 52.

Notably, the antenna 50 and reflector 66 may be mounted inside or outside of the dispenser, but are preferably mounted inside the dispenser to avoid damage and enhance aesthetics. When either the antenna 50 or reflector 66 is mounted on the inside of the dispenser, any surfaces through which signals must travel must be substantially transparent to the signals. In the embodiment of FIG. 2, the first and second surfaces 62, 64 should be transparent to such signals. Such surfaces may be made of plastic, fiberglass or any other material substantially transparent to electromagnetic energy.

The angle at which the antenna 50 and reflector 66 are mounted may be any angle wherein the antenna 50 and reflector 66 are arranged such that the directive radiation pattern is directed or redirected as desired. Notably, the complementary angles at which the antenna 50 and reflector 66 are mounted need not have a sum totaling 90 degrees or any other angle. The angles only complement each other to the extent necessary to properly redirect the directive radiation pattern. Furthermore, the reflector 66 and its reflective surface need not be flat, but may be shaped to further focus or direct the directive radiation pattern.

Certain modifications and improvements will occur to those skilled in the art upon reading the foregoing description. It should be understood that all such modifications and improvements have been deleted herein for the sake of conciseness and readability, but are properly within the scope of the following claims.

I claim:

1. A fuel dispenser antenna configuration comprising:

a. a fuel dispenser housing having a front panel separating an interior portion of said fuel dispenser and a fueling position in front of said panel;

b. an antenna having a directional radiation pattern for receiving or transmitting electromagnetic energy, said antenna mounted in said interior portion of said fuel dispenser in a first plane so that said directional radiation pattern extends in a first direction; and c. a reflective surface mounted adjacent to said antenna in said fuel dispenser housing in a second plane and at an angle different from said first plane for redirecting said directional radiation pattern of said antenna so that said directional radiation pattern of said antenna reflects off of said reflective surface and extends in a second direction through said front panel of said fuel dispenser and over a fueling position wherein said electromagnetic energy transmitted from said antenna is initiated with said dispenser housing and ultimately directed over the fueling position.

2. The fuel dispenser antenna configuration of claim 1 wherein said reflective surface is metallic.

3. The fuel dispenser antenna configuration of claim 1 wherein said reflective surface is a metal foil.

4. The fuel dispenser antenna configuration of claim 3 wherein said reflective surface is a metal foil having an adhesive backing.

5. The fuel dispenser antenna configuration of claim 1 wherein said first plane is substantially horizontal.

6. The fuel dispenser antenna configuration of claim 1 wherein said antenna is a radio frequency antenna.

7. The fuel dispenser antenna configuration of claim 6 wherein said antenna is a microwave frequency antenna.

8. The fuel dispenser antenna configuration of claim 6 wherein said antenna is a block-shaped antenna having a directional radiation pattern to one surface and a surface substantially perpendicular to said directional radiation pattern.

9. The fuel dispenser antenna configuration of claim 1 wherein said first plane is not substantially horizontal.

10. The fuel dispenser antenna configuration of claim 1 wherein said second plane is at an angle complementary to said first plane in order to reflect said directional radiation pattern substantially over the fueling position.

11. The fuel dispenser antenna configuration of claim 9 wherein said second plane is at an angle complementary to said first plane in order to reflect said directional radiation pattern substantially horizontally over the fueling position.

12. A fuel dispenser comprising:

a. a fuel dispenser housing having a front face and including fuel delivery hardware;

b. an antenna having a directional radiation pattern for receiving or transmitting electromagnetic energy, said antenna mounted within said fuel dispenser housing in a first plane forming an angle with a vertical plane so that said directional radiation pattern extends in a first direction at an angle with the vertical plane; and c. a reflective surface proximate to said antenna on said fuel dispenser housing in a second plane at an angle different from said first plane for redirecting said directional radiation pattern of said antenna so that said directional radiation pattern of said antenna reflects off of said reflective surface and extends in a second direction over a fueling position wherein said electromagnetic energy transmitted from said antenna is initiated with said dispenser housing an ultimately directed over the fueling position.

13. The fuel dispenser of claim 12 wherein said housing includes a first surface in said first plane for mounting said antenna.

14. The fuel dispenser of claim 13 wherein said housing includes a second surface in said second plane for said reflective surface.

15. The fuel dispenser of claim 13 wherein said antenna is mounted inside of said housing on said first surface, said first surface being transparent to electromagnetic energy.

16. The fuel dispenser of claim 14 wherein said reflective surface is inside of said housing on said second surface, said second surface being transparent to electromagnetic energy.

17. The fuel dispenser of claim 12 wherein said antenna is a block-shaped antenna having a directional radiation pattern normal to one surface and a surface substantially normal to said directional radiation pattern in the first direction.

18. The fuel dispenser antenna configuration of claim 12 wherein said first plane is substantially horizontal.

19. The fuel dispenser antenna configuration of claim 12 wherein said second plane is at an angle complementary to said first plane in order to reflect said directional radiation pattern substantially over the fueling position.

20. The fuel dispenser antenna configuration of claim 18 wherein said second plane is at an angle complementary to said first plane in order to reflect said directional radiation pattern substantially over the fueling position.

21. The fuel dispenser of claim 12 wherein said reflective surface is metallic.

22. The fuel dispenser of claim 21 wherein said reflective surface is a metal foil.

23. The fuel dispenser of claim 22 wherein said reflective surface is a metal foil having an adhesive backing.

24. A fuel dispenser comprising:

a. a fuel dispenser housing having an electromagnetic wave transparent front face with a first surface extending inward from said front face at a direct angle and a second surface extending inward from said front face toward said first surface at a second angle, said housing including fuel delivery hardware;

b. an antenna having a directional radiation pattern for receiving or transmitting electromagnetic energy mounted on said first surface so that said directional radiation pattern extends in a first direction normal to said first surface; and c. a reflective surface on said second surface for redirecting said directional radiation pattern of said antenna so that said directional radiation pattern of said antenna reflects off of said reflective surface and extends in a second direction over a fueling position wherein said electromagnetic energy transmitted from said antenna is initiated with said dispenser housing an ultimately directed over the fueling position.

25. The fuel dispenser of claim 24 wherein said second surface is at an angle complementary to said first surface in order to reflect said directional radiation pattern substantially over the fueling position.

26. The fuel dispenser of claim 24 wherein said first surface is substantially horizontal.

27. The fuel dispenser of claim 26 wherein said second angle is complementary to said first angle in order to reflect said directional radiation pattern substantially over the fueling position.

28. The fuel dispenser of claim 24 wherein said antenna is mounted inside of said housing on said first surface, said first surface being transparent to electromagnetic energy.

29. The fuel dispenser of claim 24 wherein said reflective surface is inside of said housing on said second surface, said second surface being transparent to electromagnetic energy.

30. The fuel dispenser of claim 29 wherein said reflective surface is a metal foil attached inside said housing on said second surface.

31. The fuel dispenser of claim 24 wherein said dispenser housing face is transparent to electromagnetic energy.

32. The fuel dispenser of claim 24 further including a cash acceptor, said first surface extending inward from said front face toward a top portion of said cash acceptor and said second surface extending inward from said from face toward a bottom portion of said cash acceptor.

33. A method of providing a directive radiation pattern in a fuel dispenser comprising:

a. providing a directive radiation pattern in a first direction from a radio frequency antenna inside a fuel dispenser housing; and b. redirecting the directive radiation pattern in a second direction over a fueling position associated with the fuel dispenser with a reflective surface wherein said electromagnetic energy transmitted from said antenna is initiated with said dispenser housing an ultimately directed over the fueling position.

34. The method of claim 33 further including the step of transmitting radio frequency signals over the fueling position in the directive radiation pattern.

35. The method of claim 33 further including the step of receiving radio frequency signals emanating over the fueling position in the directive radiation pattern.

* * * * *